(12) United States Patent
Thouless et al.

(10) Patent No.: US 10,094,641 B2
(45) Date of Patent: Oct. 9, 2018

(54) BLAST/IMPACT FREQUENCY TUNING AND MITIGATION

(71) Applicant: The Regents of The University of Michigan, Ann Arbor, MI (US)

(72) Inventors: Michael Thouless, Ann Arbor, MI (US); Ellen M. Arruda, Ann Arbor, MI (US); Tanaz Rahimzadeh, Ann Arbor, MI (US); Levon Cimonian, Kentwood, MI (US); Marie Rice, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 15/948,505

(22) Filed: Apr. 9, 2018

(65) Prior Publication Data
US 2018/0224246 A1    Aug. 9, 2018

Related U.S. Application Data (63) Continuation of application No. 15/182,843, filed on Jun. 15, 2016, which is a continuation-in-part of application No. 15/036,293, filed as application No. PCT/US2014/065658 on Nov. 14, 2014, now Pat. No. 9,958,238.

(60) Provisional application No. 62/180,931, filed on Jun. 17, 2015, provisional application No. 61/904,206, filed on Nov. 14, 2013.

(51) Int. Cl.
*F41H 5/04* (2006.01)
*F41H 1/04* (2006.01)

(52) U.S. Cl.
CPC .... *F41H 5/04* (2013.01); *F41H 1/04* (2013.01)

(58) Field of Classification Search
CPC .................................... F41H 5/04; F41H 1/04
USPC ....................................................... 89/36.02
See application file for complete search history.

(56) References Cited

U.S. PATENT DOCUMENTS

| | | | |
|---|---|---|---|
| 3,573,150 A * | 3/1971 | Broutman et al. | B32B 27/00 2/2.5 |
| 3,658,635 A | 4/1972 | Eustice | |
| 4,836,084 A | 6/1989 | Vogelesang et al. | |
| 4,838,166 A | 6/1989 | Spies et al. | |
| 4,989,493 A | 2/1991 | Blommer et al. | |
| 5,506,051 A * | 4/1996 | Levy-Borochov | B29C 41/22 428/332 |

(Continued)

FOREIGN PATENT DOCUMENTS

| | | |
|---|---|---|
| DE | 2851429 A1 | 12/1979 |
| DE | 3544929 C1 | 5/1987 |

OTHER PUBLICATIONS

International Search Report and Written Opinion issued in PCT/US2014/065658, dated Aug. 18, 2015; ISA/KR.

(Continued)

*Primary Examiner* — Joshua E Freeman
(74) *Attorney, Agent, or Firm* — Harness, Dickey & Pierce, P.L.C.

(57) ABSTRACT

A tuning and mitigation system and method for mitigating a blast or impact event having an elastic layer having an acoustic impedance chosen to tune stress waves resulting from the blast or impact to one or more specific tuned frequencies, and a dissipative layer made of a viscoelastic material having a critical damping frequency that matches at least one or more specific tuned frequencies.

11 Claims, 5 Drawing Sheets

(56) References Cited

U.S. PATENT DOCUMENTS

| | | | |
|---|---|---|---|
| 6,033,756 A | 3/2000 | Handscomb | |
| 6,108,825 A | 8/2000 | Bell et al. | |
| 6,389,594 B1 | 5/2002 | Yavin | |
| 6,425,141 B1* | 7/2002 | Ewing | A42B 3/062 2/412 |
| 6,677,034 B1* | 1/2004 | Hooley | B06B 1/0603 102/303 |
| 6,698,331 B1 | 3/2004 | Yu et al. | |
| 6,782,792 B1 | 8/2004 | Edberg et al. | |
| 6,895,851 B1* | 5/2005 | Adams | F41H 5/023 428/547 |
| 8,020,220 B2* | 9/2011 | McElroy | A42B 3/04 2/467 |
| 8,046,845 B1* | 11/2011 | Garcia | A42B 3/061 2/2.5 |
| 8,297,168 B2* | 10/2012 | Jones | B32B 17/10009 89/36.02 |
| 8,365,649 B1 | 2/2013 | Andrews | |
| 8,668,803 B1* | 3/2014 | Biberger | B01J 23/42 156/274.4 |
| 8,746,122 B1* | 6/2014 | Roland | F41H 5/04 89/36.02 |
| 8,746,123 B2 | 6/2014 | Eckhoff et al. | |
| 8,752,469 B2* | 6/2014 | Eckhoff | F41H 5/0457 89/36.02 |
| 2002/0184699 A1 | 12/2002 | Ewing et al. | |
| 2003/0192426 A1* | 10/2003 | Peretz | B32B 17/10018 89/36.02 |
| 2012/0152098 A1* | 6/2012 | Howland | B32B 5/12 89/36.02 |
| 2012/0180627 A1* | 7/2012 | Hunn | F41H 5/04 89/36.02 |
| 2012/0297964 A1 | 11/2012 | Carberry et al. | |
| 2013/0000474 A1* | 1/2013 | Eckhoff | F41H 1/04 89/36.02 |
| 2013/0000475 A1 | 1/2013 | Eckhoff et al. | |
| 2013/0000476 A1 | 1/2013 | Eckhoff et al. | |
| 2013/0273273 A1* | 10/2013 | Greenhill | F41H 1/04 428/34.1 |
| 2013/0305912 A1* | 11/2013 | Weinhold | B32B 17/10045 89/36.02 |
| 2014/0150632 A1* | 6/2014 | Terrenzi | F41H 5/0457 89/36.02 |
| 2014/0208930 A1* | 7/2014 | Phillips | F41H 5/0421 89/36.02 |
| 2014/0224107 A1 | 8/2014 | Xia et al. | |
| 2014/0238224 A1* | 8/2014 | Bird | F41H 5/023 89/36.02 |
| 2014/0290473 A1 | 10/2014 | Lorenzo et al. | |
| 2014/0318357 A1 | 10/2014 | Parida et al. | |
| 2015/0168106 A1* | 6/2015 | Pyles | F41H 5/0457 89/36.02 |
| 2015/0176950 A1* | 6/2015 | Moran | F41H 5/0492 89/36.02 |
| 2015/0233680 A1* | 8/2015 | Pepka | F41H 7/04 89/36.02 |
| 2015/0237929 A1 | 8/2015 | Greenhill et al. | |
| 2016/0169633 A1* | 6/2016 | Xu | F41H 5/04 89/36.02 |
| 2016/0178328 A1 | 6/2016 | Citterio | |

OTHER PUBLICATIONS

International Search Report and Written Opinion issued in PCT/US2016/037645 dated Sep. 30, 2016.

Extended European Search Report dated Jun. 7, 2017 regarding corresponding European Patent Application No. 14881432.0.

* cited by examiner

BLAST/IMPACT FREQUENCY TUNING AND MITIGATION

CROSS-REFERENCE TO RELATED APPLICATIONS

This application is a continuation of U.S. patent application Ser. No. 15/182,843, filed Jun. 15, 2016, now U.S. patent Ser. No. 10/041,767, issued Aug. 7, 2018, which is a continuation-in-part of U.S. patent application Ser. No. 15/036,293, filed May 12, 2016, which is a U.S. National Phase Application under 35 U.S.C. § 371 of International Application No. PCT/US2014/065658 filed on Nov. 14, 2014, which claims benefit of U.S. Provisional Application No. 61/904,206, filed on Nov. 14, 2013. U.S. patent application Ser. No. 15/182,843 also claims the benefit of U.S. Provisional Application No. 62/180,931, filed on Jun. 17, 2015. The entire disclosures of the above applications are incorporated herein by reference.

GOVERNMENT INTEREST

This invention was made with government support under N00014-10-1-415, awarded by the Navy/Office of Naval Research. The Government has certain rights in the invention.

FIELD

The present disclosure relates to a novel concept for the design of structures to protect against blast and impact.

BACKGROUND AND SUMMARY

This section provides background information related to the present disclosure which is not necessarily prior art. This section provides a general summary of the disclosure, and is not a comprehensive disclosure of its full scope or all of its features.

A design strategy for a composite material, and an exemplary embodiment of that design, is presented that optimally and repeatedly dissipates energy transmitted through a composite as a result of an impact event. The design strategy, according to the principles of the present teachings, uses one or more elastic layers to modulate the frequency content of the stress wave traveling through the composite, and a viscoelastic layer to dissipate energy at that frequency. Our current experimental and computational results demonstrate that this design efficiently mitigates the pressure and dissipates the energy transmitted through the composite.

In some embodiments of the present teachings, a composite structure consisting of lightweight elastic and viscoelastic components chosen and configured to optimally reduce the impulse, while simultaneously mitigating the force (pressure) transmitted through the composite material from an impact load, is provided and is generally referred to as the MITIGATIUM™ design. The innovation of the approach that led to the development of this MITIGATIUM™ design rubric is that it recognizes that a highly dissipative material alone is generally not going to be useful in impact loadings. Rather, optimal, repeated dissipation can be obtained only by means of a layered composite in which the dissipative component is matched to the other components based on specific relationships among their respective mechanical properties.

According to the principles of the present teachings, the properties of the elastic and viscoelastic components, and their placement within the layered system, are optimally chosen to achieve three outcomes: 1) attenuate the pressure transmitted through the composite; 2) modulate the frequency content of the stress waves within the composite layers so that 3) the energy imparted by the impulse is efficiently dissipated as it is transmitted through the composite. The synergistic nature of MITIGATIUM™ arises because it couples the dissipative component to other component(s) specifically chosen to tune the stress wave traveling through the elastic materials to a frequency at which it can most efficiently be dissipated by the viscous response of the dissipative layer. Thus the innovation has little to do with the actual materials chosen for this demonstration of MITIGATIUM™, but instead lies with the concept of tuning and with the method to choose the specific combination of material properties required for a given application. In theory there is no limit to the number of combinations of elastic and viscoelastic materials that can satisfy the MITIGATIUM™ design rubric. However, the design would need to be tailored to different applications.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Introduction

At the outset, it is anticipated that the present invention will find utility in a wide range of applications, including, but not limited to, vehicle armor, personal armor, blast protection, impact protection, vests, helmets, body guards (including chest protection, shin protection, hip protection, rib protection, elbow protection, knee protection, running shoes), firing range protection, building protection, packaging of appliances and devices, and the like. It should be appreciated that the present teachings are applicable to any blast and/or impact situation.

According to the principles of the present teachings, as illustrated in the figures, a multi-layer tuning and mitigation system 10 is provided for blast and/or impact mitigation. In some embodiments, the multi-layer tuning and mitigation system 10 comprises a tuning layer assembly 12 and a dissipative layer assembly 14. In some embodiments, the tuning layer assembly 12 can comprise one or more individual elastic layers having an acoustic impedance. Similarly, dissipative layer assembly 14 can comprise one or more individual viscoelastic layers. As a result of an impact, a stress wave is produced whose frequencies entering the dissipative layer assembly 14 are determined by the mechanical and physical properties (e.g. acoustic impedance) of the tuning layer assembly 12 and the geometry and nature of the impact event itself.

The dissipative layer assembly 14 is chosen to be complementary to the tuning layer assembly 12 to tune the frequencies of the stress waves into a range that is damped by the dissipative layer assembly 14. The damping frequencies required for the dissipative layer assembly 14 are application specific; that is, they depend upon the impact event itself as well as on the shape and size of the impact mitigating structure itself.

Figure 1:
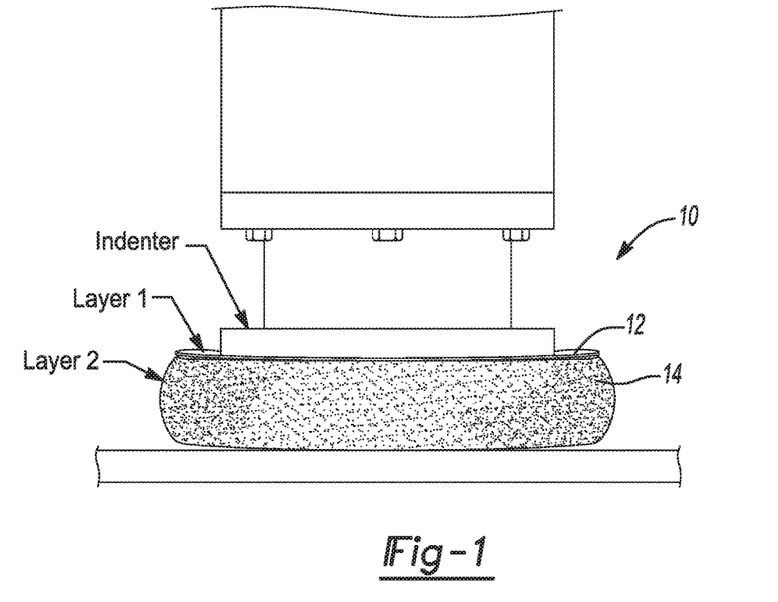
FIG. 1 illustrates a multi-layer tuning and mitigation system according to the principles of the present teachings having a single layer tuning layer assembly and a single layer dissipative layer assembly configuration.
Figure 2:
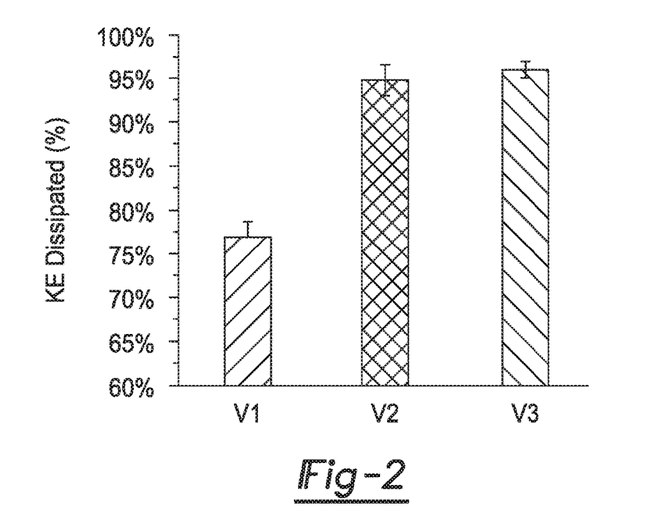
FIG. 2 is a graph illustrating the kinetic energy (KE) dissipation results of the multi-layer tuning and mitigation system of FIG. 1 for various viscoelastic materials.

With particular reference to FIGS. 1 and 2, in some embodiments, multi-layer tuning and mitigation system 10 can comprise a single-layer tuning layer assembly 12 and a single-layer dissipative layer assembly 14. In this way, single-layer tuning layer assembly 12 is an elastic material that is sufficient to work with single-layer dissipative layer assembly 14 to tune the frequencies of the stress waves of the impact. Single-layer dissipative layer assembly 14 is a viscoelastic material selected to mitigate the resulting tuned frequencies of the stress wave to dissipate the kinetic energy. As illustrated in FIG. 2 and described herein, the viscoelastic material is selected based on the particular tuned frequencies, wherein, for example, viscoelastic material V1 is sufficient to dissipate approximately 77% of the kinetic energy (KE) of the tuned frequencies, V2 is sufficient to dissipate approximately 95% of the kinetic energy (KE) of the tuned frequencies, and V3 is sufficient to dissipate approximately 96% of the kinetic energy (KE) of the tuned frequencies. FIG. 2 was generated in response to an indenter impacting the structure of FIG. 1 with a kinetic energy of approximately 10 J. In this embodiment, the tuning layer assembly 12 is a thin elastic material and dissipative layer assembly 14 is a thicker viscoelastic material. The dominant frequencies that enter the second layer in this example are in the range of 0.01-100 Hz (approximately).

Figure 3:
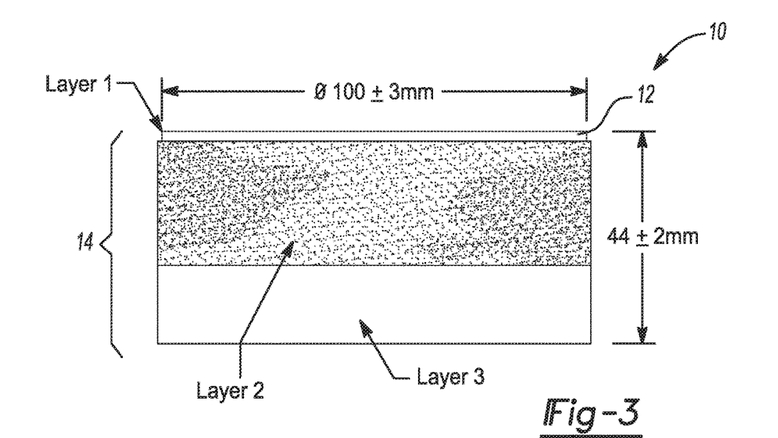
FIG. 3 illustrates a multi-layer tuning and mitigation system according to the principles of the present teachings having a single layer tuning layer assembly and a multi-layer dissipative layer assembly configuration.
Figure 4:
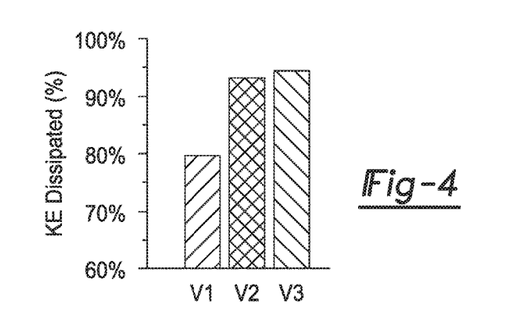
FIG. 4 is a graph illustrating the kinetic energy (KE) dissipation results of the multi-layer tuning and mitigation system of FIG. 3 for various viscoelastic materials.

With particular reference to FIGS. 3 and 4, in some embodiments, multi-layer tuning and mitigation system 10 can comprise a single-layer tuning layer assembly 12 and a multi-layer dissipative layer assembly 14. In this way, single-layer tuning layer assembly 12 is an elastic material that is sufficient to work with multi-layer dissipative layer assembly 14 to tune the frequencies of the stress waves of the impact. Multi-layer dissipative layer assembly 14 can comprise two or more viscoelastic materials selected to each mitigate a portion of the resulting tuned frequencies of the stress wave to dissipate the kinetic energy. In some embodiments, several layers of multi-layer dissipative layer assembly 14 can be used to dissipate the same frequencies, different frequencies, and/or overlapping frequencies. For example, the single-layer tuning layer assembly 12 can work to tune the stress waves to a range of frequencies, and one layer of dissipative layer assembly 14 can dissipate a first subrange of the frequencies and a second layer of dissipative layer assembly 14 can dissipate a second subrange of the frequencies. The first and second subranges can be different, overlapping, or the same. As illustrated in FIG. 4 and described herein, the viscoelastic materials of multi-layer dissipative layer assembly 14 are selected based on the particular tuned frequencies, wherein, for example, viscoelastic material composite V1 is sufficient to dissipate approximately 80% of the kinetic energy (KE) of the tuned frequencies, viscoelastic material composite V2 is sufficient to dissipate approximately 94% of the kinetic energy (KE) of the tuned frequencies, and viscoelastic material composite V3 is sufficient to dissipate approximately 95% of the kinetic energy (KE) of the tuned frequencies.

It should also be appreciated that, in some embodiments, multi-layer tuning and mitigation system 10 can comprise a multi-layer tuning layer assembly 12 and a single-layer dissipative layer assembly 14, or a multi-layer tuning layer assembly 12 and a multi-layer dissipative layer assembly 14.

In some embodiments, tuning layer assembly 12 can be modified, thereby varying its performance and acoustic impedance, by selecting the material, thickness, and, in the case of a multi-layer configuration, how and if the layers are bonded. Likewise, dissipative layer assembly 14 can be modified, thereby varying its dissipative performance, by selecting the material, thickness, and, in the case of a multi-layer configuration, how and if the layers are bonded. By way of non-limiting example, in some embodiments, tuning layer assembly 12 can be made of an elastic material, such as thermoplastics (e.g., polycarbonate, polyethylene), metals, ceramics, polymers (elastic type), composites, and biological solids (e.g. bone, ligament). Furthermore, dissipative layer assembly 14 can be made of viscoelastic material, such as polymers. It should be understood, however, that polymers may be elastic and/or viscoelastic. Whether they are elastic or viscoelastic in a given application depends upon the application temperature and the frequencies under consideration. In other words, a given polymer at a given temperature responds elastically to some frequencies and viscoelastically to other frequencies.

The tuning layer assembly 12 is typically chosen based on other functional requirements of the application, such as chip resistance of a layered paint, ballistic penetration resistance in a military armor, and protecting the skull against facture in a sport helmet. The acoustic impedance of the tuning layer assembly 12 is therefore set once this choice is made (however there may be several materials that fit the bill). The thickness of the tuning layer assembly 12 may also be set by these existing functional requirements. The thermomechanical and physical attributes of the tuning layer assembly 12 determine one of the frequencies that will be passed to the dissipative layer assembly 14 in a tuned design. They also provide the mass of the tuning layer assembly 12, which together with the dissipative layer assembly 14, will determine an additional frequency that is passed to the dissipative layer assembly 14 in a dynamic system (mass-spring in which the tuning layer assembly 12 is the mass and the dissipative layer assembly 14 is the spring). The dissipative layer assembly 14 is chosen to have a lower acoustic impedance than the tuning layer assembly 12, to provide the tuning and to mitigate the force transmitted. The elastic properties of the dissipative layer assembly 14 determine this impedance; optimal tuning requires a significant impedance reduction in layer 2 from that of layer 1. The dissipative layer assembly 14 may include portions that are elastic, in which it acts as the spring in a mass-spring dynamic system that has a characteristic frequency, or it may include portions that are viscoelastic to additionally damp either the tuned frequency or the mass-spring frequency, or both. If the dissipative layer assembly 14 is elastic in part, additional viscoelastic layers are required to dissipate the impulse. A viscoelastic dissipative layer assembly 14 is both elastic and viscous, so that it satisfies all of the previously described functions of the dissipative layer assembly 14 to tune with the tuning layer assembly 12 and vibrate with the tuning layer assembly 12 as a mass-spring system. In addition it is chosen to damp one or more of the frequencies. If the dissipative layer assembly 14 is elastic, an additional layer is chosen to damp the transmitted frequencies.

For purposes of illustration, the present invention will be discussed in connection with design of a football helmet. However, as set forth herein, the following should not be regarded as limiting the present invention to only the illustrated embodiments.

Technical Approach

Strategy for Head Health—

When the head is subjected to an impulsive force such as an impact or blast wave, there are two attributes to the event that can lead to damage in the brain. The first is the directly transmitted force (corresponding directly to the acceleration of the head). The second is the transmitted impulse (corresponding to the absolute change, not the rate of change, of the velocity of the head). It has been known, but not generally recognized, for more than 70 years, that the damage in long duration impulses depends on the peak force, while the damage in short duration impulses depends on the magnitude of the impulse. To limit the force in the design of a helmet, one can utilize elastic impedance mismatch to reduce the force, and energy dissipation to reduce the impulse. Our design strategy is unique in that it specifically targets both in a deliberate, rather than incidental, fashion.

Description of the Material—

The technical approach is a strategy to design a composite material for the optimal mitigation of an impulse using elastic and viscoelastic solids. Additional reference should be made to PCT Application Serial No. PCT/US2014/065658 entitled: "Blast/Impact Frequency Tuning and Mitigation" which is incorporated herein by reference.

A sport's (football) helmet is chosen as a design example. Current helmet designs have other functions, such as preventing skull fracture; therefore we chose materials for the present demonstration that are similar to those currently used. The outer shell of a football helmet is often a thermoplastic, such as polycarbonate (PC), therefore we limited our choice of outer shell layer to similar polymers. These materials do not plastically deform under the impact loadings seen in sports. Therefore, they respond as linear elastic solids. Mitigating the force transmitted through elastic materials is easily accomplished by an impedance mismatch approach. Current helmets utilize this strategy effectively by coupling the first, high elastic impedance layer to a second, low-elastic-impedance layer. We chose an elastic material for the second layer having elastic impedance much lower than that of the first layer to preserve the force mitigating properties of existing helmets, and to provide the tuning that is at the heart of our design. A vinyl foam serves this purpose in our design. Elastic materials do not dissipate any of the energy associated with an impact; therefore, a strategy that focuses on reducing the force of an impact through elastic impedance mismatch does nothing to mitigate the impulse. Stated another way, this strategy does not dissipate the energy of the impact. A third or dissipative, viscoelastic layer, can dissipate energy; the optimal choice for the dissipative properties of the third layer depends on the properties of the first two layers.

We limited the selection of the dissipative third material layer to viscoelastic materials because the design must be capable of dissipating the same amount of energy every time the helmet is impacted. Plastically deforming materials and materials that fracture, delaminate, craze, and/or crack upon an initial impact will not be effective in dissipating energy upon subsequent impacts of equal intensity. A linear viscoelastic material can dissipate energy repeatedly. However, it is most effective at dissipating energy at one specific frequency: this critical frequency ($f_{CRIT}$) is a function of its unrelaxed and relaxed moduli and its characteristic relaxation time. In an impact, the stress wave transmitted to a solid material contains a broad spectrum of energy, therefore, this same viscoelastic material acting alone will not be effective in dissipating impact energy.

Our novel solution to optimizing viscoelastic dissipation is to tune the stress wave that enters the viscoelastic material to a frequency that matches $f_{CRIT}$ and effectively damp that frequency. The first one or two layers of the composite in MITIGATIUM™ modulate the stress wave to a frequency that is dependent upon their elastic, physical, and geometric properties in addition to mitigating the magnitude of the stress wave. Thus both the force (or stress) magnitude and the impulse transmitted are reduced using the MITIGATIUM™ approach. A fourth layer of comfort foam is optionally used in the design because it serves important functions in current helmet designs. In addition to providing comfort to the wearer, it enables an adjustable fit.

Data Supporting Energy Dissipation—

Impact experiments have been conducted on MITIGATIUM™ and on an existing helmet design and determined that MITIGATIUM™ results in a significantly lower peak acceleration than the existing helmet does. We have compared these experimental results to computational analyses to validate our computational models of impact loading and stress wave propagation. We also conducted one- and two-dimensional computational analyses of a MITIGATIUM™ helmet design and an existing helmet design on a skull/brain system to demonstrate the energy dissipating capabilities of MITIGATIUM™. Our results demonstrate that the MITIGATIUM™ helmet reduces the pressure and impulse transmitted to the skull and hence, the brain, and MITIGATIUM™ also reduces translational and rotational accelerations within the brain compared to those of an existing helmet design.

Impact Measurements—

A MITIGATIUM™ prototype specimen was built as follows: layer 1, 2.4 mm thick PE (McMaster Carr); layer 2, 12.7 mm thick vinyl nitrile (Grainger); layer 3, 14.3 mm thick polyurethane (PU, McMaster Carr, actually three 4.1 mm layers of PU stacked together); layer 4, 12.7 mm thick soft "comfort" foam (McMaster Carr). The overall dimensions of the MITIGATIUM™ specimen were 305 mm×305 mm×42 mm ["MITIGATIUM™ unbounded"]. A test specimen based on an existing helmet design was also built. It consisted of PC (3.2 mm thick, McMaster Carr), vinyl (25.4 mm thick, Grainger), and soft foam (12.7 mm thick, McMaster Carr) layers such that its overall size was 305 mm×305 mm×41 mm ["Current unbounded"]. Duplicate sets of each specimen type were built and these layers were bonded together using a spray-on adhesive (3M Super 77) ["MITIGATIUM™ bonded" and "Current bonded"]. A cylindrical steel indenter (2.8 kg, 7.5 cm diameter, 7.5 cm length, McMater Carr) was used to impact each specimen. The indenter was dropped from a height of 72 cm (20 J) using a quick release and the position vs. time of the indenter was filmed via a high-speed digital video camera (Optotrak Certus) at a rate of 400 images/s. Each sample type was indented five times.

The derivative of the position vs. time data was computed using a 5-point centered finite differencing method to obtain velocity vs. time data. The derivative of the velocity vs. time data was similarly computed to obtain acceleration vs. time data. The peak acceleration of the indenter was determined for each sample type and the results appear in Table 1. The peak accelerations of the indenter during impact of the bonded specimens exceeded those of the unbonded specimens for both MITIGATIUM™ and Current samples. The peak accelerations of the indenter during impact of the two "Current" samples exceeded those of the MITIGATIUM™ samples for both bonded and unbonded cases. Therefore, the lowest peak indenter acceleration was that impacting the unbonded MITIGATIUM™ sample. As described herein, the acceleration of the head in an impact is directly proportional to the peak force transmitted through a helmet to the skull. The impact experiments performed here are not a direct indication of the force transmitted through the samples, but the acceleration of the indenter serves as a proxy for the skull and provides an indication of the force mitigating response of the samples. Therefore, these results indicate the MITIGATIUM™ sample is a better attenuator of force than the current helmet design is, and unbounded layers attenuate force better than bonded layers.

TABLE 1

Peak acceleration experimental results.

| Specimen | Peak Acceleration ± SD [m/s$^2$] |
|---|---|
| MITIGATIUM ™ unbonded | 519 ± 22 |
| Current unbonded | 689 ± 43 |
| MITIGATIUM ™ bonded | 599 ± 15 |
| Current bonded | 696 ± 27 |

Indenter Impact Simulations—

Figure 5:
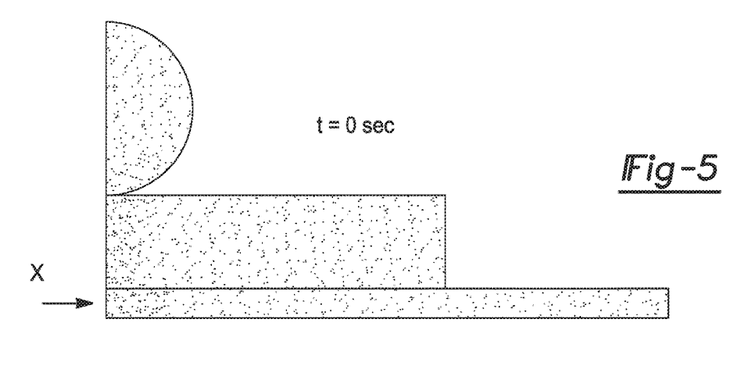
FIG. 5 illustrates the model geometry for indenter impact simulations.

The experimental indenter impact procedure was replicated computationally using the same geometries for the specimens and indenter as in the experiments, and the mechanical and material properties for the layers in Table 2. Simulations assumed all layers in the samples were bonded (to avoid prescribing frictional contact properties) but no bonded layers existed; nodes from layer one were tied to nodes of layer two, et cetera. Thus the effect of the mechanical properties of the adhesive layers in the experiments is not examined in these computational simulations. The commercial finite-element package ABAQUS Explicit was used for the simulations. The computational model geometry appears in FIG. 5. The indenter was given an initial velocity of 3.7 m/s corresponding to the velocity of a 2.8 kg indenter dropped from a height of 72 cm, in accordance with the experiments. A body force of 79,000 kg/m²s² (density*gravity) was also applied to the indenter to account for the gravitational force. The maximum indenter accelerations determined from these analyses are: MIGATIUM™ bonded, 550 m/s²; Current bonded, 700 m/s². The computational results are within 10% of the mean experimental values for the peak accelerations given in Table 1. These results replicate what was determined experimentally, namely, MITIGATIUM™ is a better force attenuator than the Current helmet design. These computational results provide reasonable confidence that we can explore the impact response of various helmet designs in transmission to predict the force and impulse mitigation properties, and therefore injury preventative responses, of the current MITIGATIUM™ embodiment, or of an optimal embodiment, vs. current helmet designs.

TABLE 2

Mechanical and physical properties of layers used in computational analysis of impact.

| | Young's Modulus [MPa] | Poisson's Ratio | Density [kg/m³] | Unrelaxed Modulus [MPa] | Relaxed Modulus [MPa] | Characteristic Time [seconds] |
|---|---|---|---|---|---|---|
| PE | 755 | 0.35 | 950 | | | |
| Vinyl | 0.16 | 0.1 | 130 | | | |
| PU | | 0.4 | 1200 | 100 | 0.2 | 3.5E−8 |
| Foam | | | 80 | 1.0 | 0.052 | 1.9E−8 |
| PC | 2200 | 0.35 | 1175 | | | |

One-Dimensional Analysis of Transmission Through Elastic and Viscoelastic Layers—

The mechanics of impact wave transmission through layers of elastic and viscoelastic materials, such as those found in existing football helmets, were analyzed and the MITIGATIUM™ design was developed for a new sports helmet comprised of layers that can optimally dissipate impact energy. Our results demonstrate that an existing helmet design may reduce the over-pressure transmitted to the skull on the interior of the helmet by an order of magnitude over that delivered by the impact to the external surface of the helmet, but it has no effect on the impulse transmitted.

The new MITIGATIUM™ design paradigm cannot only further reduce the over-pressure by an additional order of magnitude over existing approaches, it can also reduce the impulse delivered to the brain by an order of magnitude.

This is accomplished by a viscoelastic layer chosen to match the tuning induced by the other one or two layers. Linear viscoelastic materials dissipate energy at specific frequencies and do so repeatedly. It should again be emphasized that an arbitrary impact to a helmet will not result in a stress wave with an optimal frequency distribution to be dissipated, whether these be designs with monolithic materials or fluid-filled or air-gap designs. All of these designs, like the viscoelastic design, will dissipate energy optimally at specific frequencies. Therefore, the optimally dissipative design concept needs to contain the frequency tuning aspect.

A single- or multi-layer design allows for tuning of an arbitrary impact into a specific frequency that can be optimally dissipated by the viscoelastic layer. The viscoelastic layer, acting alone, is not effective. Our one-dimensional analysis shows that the use of a viscoelastic material alone, without tuning components, transmits 90% of the impulse of an impact event. However, when a viscoelastic material is optimally coupled to elastic materials that tune the stress wave to the critical damping frequency of the viscoelastic material, less than 30% of the impulse is transmitted.

In some embodiments, this optimal MITIGATIUM™ design can comprise a tuned frequency that is high, so the thickness of the third dissipative layer is reduced because of the higher tuning frequency. Therefore, this optimal MITIGATIUM™ would be thinner and lighter weight than current football helmets. The required properties of the viscoelastic material are well within any expected range of polyurethanes.

Two-Dimensional Analysis of Impact Response of Helmets—

Figure 6A:
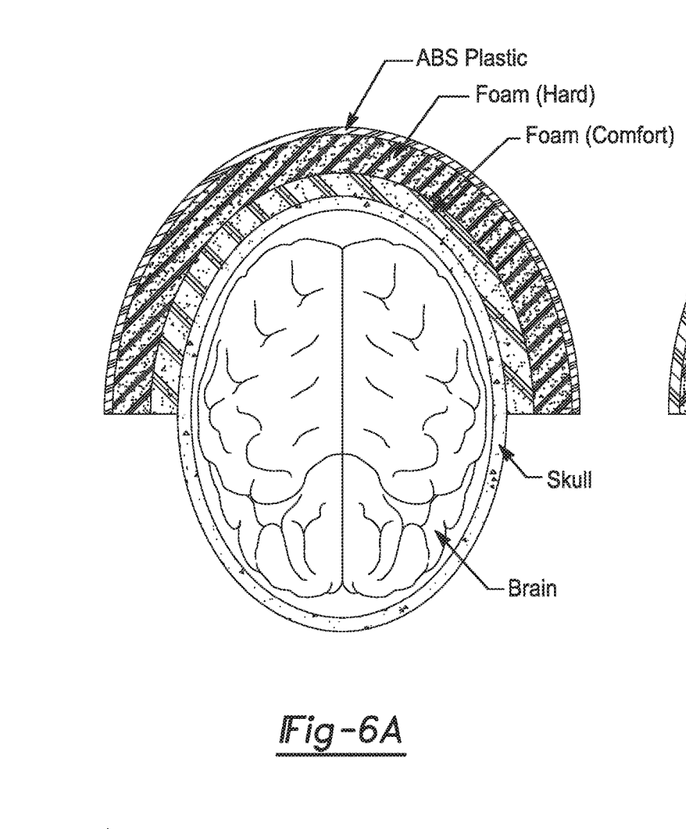
FIG. 6A illustrates the model geometry of a conventional helmet design.
Figure 6B:
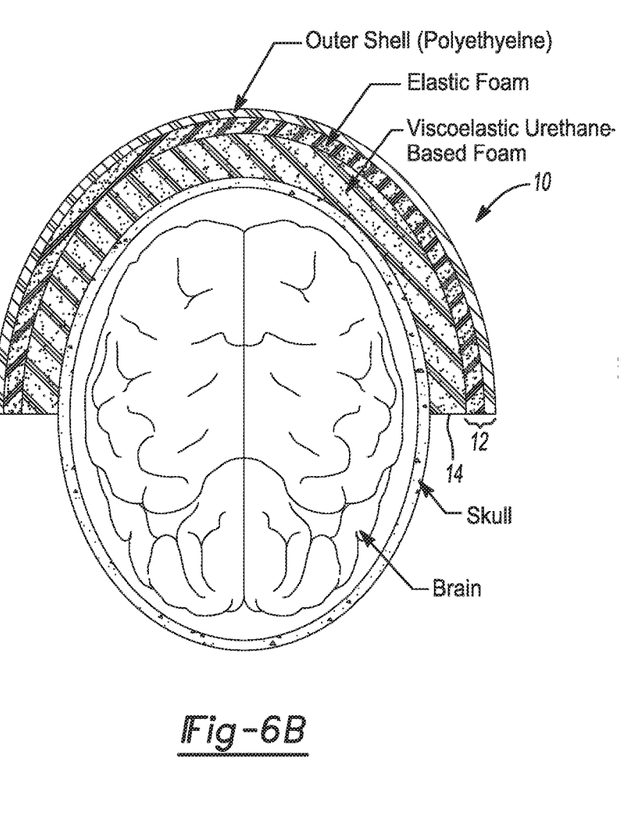
FIG. 6B illustrates the model geometry of a MITIGATIUM™ helmet design according to the present teachings.
Figure 6C:
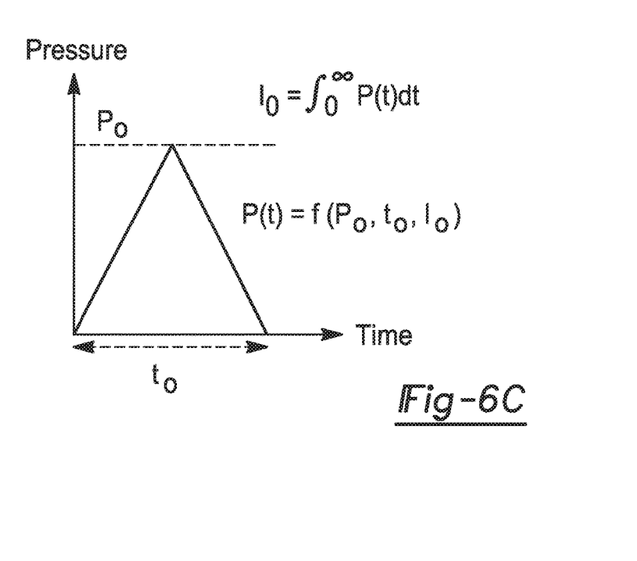
FIG. 6C is a graph illustrating pressure vs. time history of oblique impact loading.

A MITIGATIUM™ helmet design was compared to an existing sport helmet using two-dimensional finite element analyses of impact loading. The commercial finite-element package ABAQUS Explicit was again used for the simulations. The geometries used in the finite-element models are shown in FIGS. 6A and 6B. In these simulations, the head was modeled as a two-component system consisting of an outer rim with a material having properties that approximated a skull, and an inner region of material having properties approximating the brain. The model corresponding to an existing football helmet design has a 4 mm outer layer of ABS plastic, a 23 mm second layer of a hard foam, and a 9 mm inner layer of "comfort" foam, as shown in FIG. 6A. The MITIGATIUM™ helmet in FIG. 6B was chosen to have the same mass and volume as the existing helmet. The 4 mm outer shell layer is polyethylene, the 20.5 mm second layer is a styrene-based elastic foam, and the 2.5 mm third layer is a viscoelastic urethane-based material. The fourth layer on this helmet is not necessary; it is included to match the size and weight of the existing helmet, and because the comfort foam is important to helmet wearers. In fact, the MITIGATIUM™ helmet design can be made significantly thinner and lighter than the existing helmet. Choosing equal mass designs normalizes the response, as the effectiveness of armor in reducing momentum transfer depends on mass. The helmet models were subjected to an oblique impact pressure load of shape and duration shown in FIG. 6C. Peak pressure and impulse transmitted to the skull were determined. Linear and rotational accelerations were examined throughout the region of the brain and peak values recorded for comparison. The results are shown in Table 3 and in FIGS. 7A-7C. As the table shows, the choice of outer layer affects the pressure, impulse, and duration of the impact imparted to the helmet from a given impact load. The last two columns compare the pressure and impulse transmitted to the skull by the two helmet designs, these are normalized by the values transmitted by the existing helmet design. The MITIGATIUM™ helmet transmits less than 1% of the pressure and 31% of the impulse that the existing helmet transmits. It is important to appreciate that it is only in this type of geometry—where there is interaction between the head and the helmet—that the full effects of impulse transmission be considered. Ultimately, the validation needs to be conducted with this type of geometry, rather than considering impulses transmitted to a massive rigid plate.

Figure 7A:
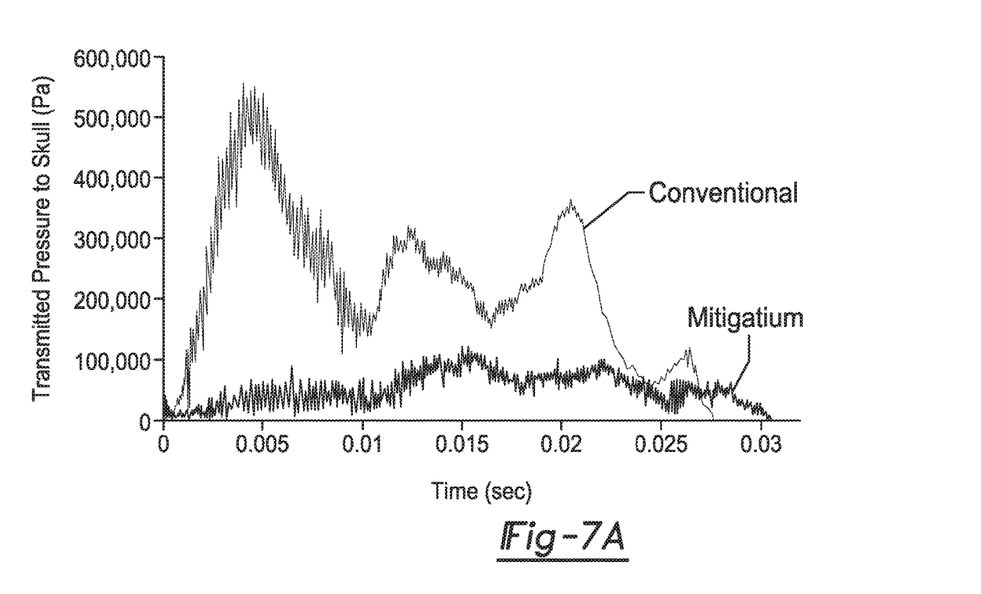
FIGS. 7A-7C are graphs illustrating the peak pressure, translational acceleration, and rotational acceleration histories inside the brain in conventional and MITIGATIUM™ helmet designs.
Figure 7B:
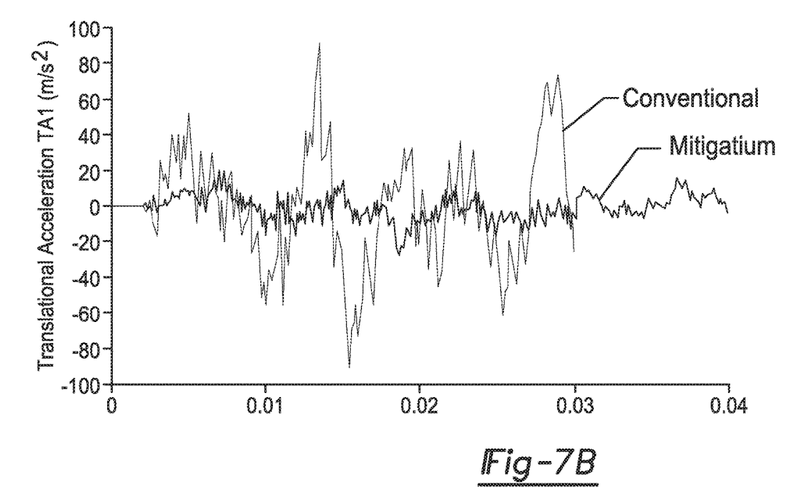
Figure 7C:
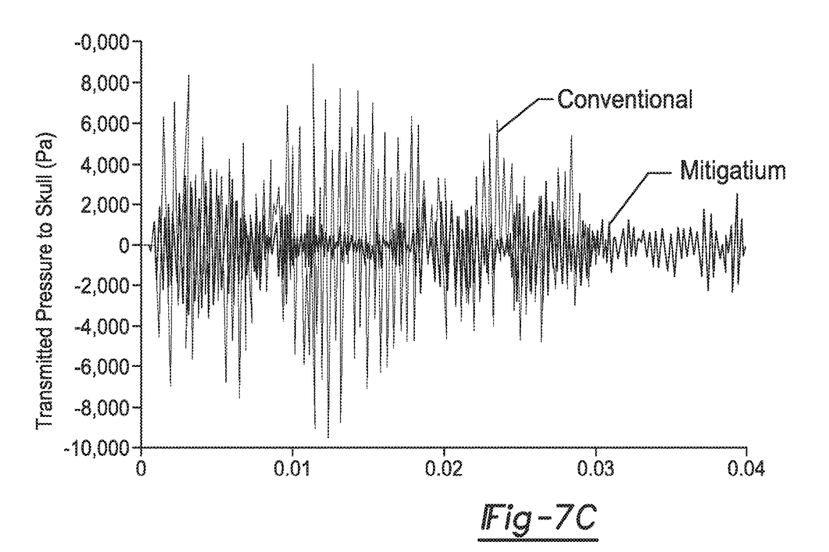

FIGS. 7A-7C show the peak pressure, translational acceleration, and rotational acceleration histories inside the brain in both helmet designs. The peak values occur at different nodes for the various quantities recorded, and for different nodes in each helmet, but in every case, the highest magnitude was searched within the entire brain region and that is what is recorded for comparison. The significant reductions in the peak pressure and accelerations for the MITIGATIUM™ helmet are clearly seen in the figure. It is also evident from FIGS. 7A-7C that in the existing undamped helmet, a single-impact loading-event results in multiple peak-acceleration events.

TABLE 3

Pressure transmitted, impulse transmitted, and duration of transmission for an existing helmet design vs. the MITIGATIUM ™ design.

| | $P_0$ [MPa] | $I_0$ [Pa-sec] | $t_0$ [ms] | $\frac{P_{trans}}{P_{existing}}$ | $\frac{I_{trans}}{I_{existing}}$ |
|---|---|---|---|---|---|
| Existing helmet | 1.3 | 5400 | 8 | 1 | 1 |
| Optimal MITIGATIUM ™ helmet | 0.54 | 3400 | 12 | 0.0012 | 0.31 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for mitigating a blast or impact event, the method comprising:
   collectively choosing an elastic layer and a viscoelastic dissipative layer to tune stress waves resulting from the blast or impact to one or more specific tuned frequencies that match a critical damping frequency of the dissipative layer such that densities and thicknesses of the elastic layer and of the dissipative layer are matched to an unrelaxed modulus, relaxed modulus, and critical frequency of the dissipative layer; and
   positioning the dissipative layer proximate to the elastic layer.

2. The method according to claim 1 wherein the step of collectively choosing the elastic layer and the viscoelastic dissipative layer to tune the stress waves resulting from the blast or impact to the one or more specific tuned frequencies that match the critical damping frequency of the dissipative layer comprises collectively choosing the elastic layer and the viscoelastic dissipative layer to tune the stress waves resulting from the blast or impact to the one or more specific tuned frequencies that match the critical damping frequency of the dissipative layer such that the ratio of the unrelaxed to relaxed moduli of the dissipative layer being at least 10 so as to viscoelastically dissipate at least 80% of the kinetic energy of a plurality of cycles of the one or more specific tuned frequencies.

3. The method according to claim 1 wherein the elastic layer comprises two or more individual layers.

4. The method according to claim 1 wherein the dissipative layer comprises two or more individual layers.

5. The method according to claim 4 wherein the step of collectively choosing an elastic layer and a viscoelastic dissipative layer comprises choosing a first of the two or more individual layers of the dissipative layer to dissipate a first of the specific tuned frequencies and choosing a second of the two or more individual layers of the dissipative layer to dissipate a second of the specific tuned frequencies, the second specific tuned frequency being different than the first specific tuned frequency.

6. The method according to claim 4 wherein the step of collectively choosing an elastic layer and a viscoelastic dissipative layer comprises choosing a first of the two or more individual layers of the dissipative layer to dissipate a first of the specific tuned frequencies and choosing a second of the two or more individual layers of the dissipative layer to dissipate a second of the specific tuned frequencies, the second specific tuned frequency being the same as the first specific tuned frequency.

7. The method according to claim 1 wherein the step of collectively choosing the elastic layer and the viscoelastic dissipative layer to tune the stress waves resulting from the blast or impact to one or more specific tuned frequencies that match the critical damping frequency of the dissipative layer comprises collectively choosing the elastic layer and the viscoelastic dissipative layer to tune the stress waves resulting from the blast or impact to one or more specific tuned frequencies that match the critical damping frequency of the dissipative layer using material parameters.

8. The method according to claim 7 wherein the material parameters are chosen from the group consisting of thickness, material type, and bonding type.

9. The method according to claim 1 the step of collectively choosing the elastic layer and the viscoelastic dissipative layer to tune the stress waves resulting from the blast or impact to one or more specific tuned frequencies that match the critical damping frequency of the dissipative layer comprises collectively choosing the elastic layer and the viscoelastic dissipative layer to allow passage of the one or more specific tuned frequencies to the dissipative layer, whereby the one or more specific tuned frequencies is dissipated in the dissipative layer.

10. The method according to claim 1 the step of collectively choosing the elastic layer and the viscoelastic dissipative layer to tune the stress waves resulting from the blast or impact to one or more specific tuned frequencies that match the critical damping frequency of the dissipative layer comprises collectively choosing the elastic layer and the viscoelastic dissipative layer such that a thickness of the dissipative layer is sufficient that the presence of the stress wave at the one or more specific tuned frequencies substantially decays before passage of the stress wave through the dissipative layer.

11. The method according to claim 1 wherein the step of positioning the dissipative layer proximate to the elastic layer comprises joining the dissipative layer to the elastic layer.

* * * * *

UNITED STATES PATENT AND TRADEMARK OFFICE
CERTIFICATE OF CORRECTION

PATENT NO. : 10,094,641 B2
APPLICATION NO. : 15/948505
DATED : October 9, 2018
INVENTOR(S) : Michael Thouless et al.

Page 1 of 1

It is certified that error appears in the above-identified patent and that said Letters Patent is hereby corrected as shown below:

In the Specification

Column 1, Line 23, under "Government Interest," delete "This invention was made with government support under N00014-10-1-415, awarded by the Navy/Office of Naval Research. The Government has certain rights in the invention." and insert --This invention was made with government support under N00014-10-1-0415, awarded by the U.S. Navy/Office of Naval Research. The government has certain rights in the invention.-- therefor.

Signed and Sealed this
Nineteenth Day of February, 2019

Andrei Iancu
*Director of the United States Patent and Trademark Office*